(12) United States Patent
Hevner et al.

(10) Patent No.: US 11,254,605 B2
(45) Date of Patent: Feb. 22, 2022

(54) METHODS OF REDUCING THE THICKNESS OF TEXTURED GLASS, GLASS-CERAMIC, AND CERAMIC ARTICLES WITH HIGH CONCENTRATION ALKALI HYDROXIDE AT ELEVATED TEMPERATURE

(71) Applicant: CORNING INCORPORATED, Corning, NY (US)

(72) Inventors: Janette Dawn Hevner, Addison, NY (US); Yuhui Jin, Painted Post, NY (US); Aize Li, Painted Post, NY (US); John Robert Saltzer, Jr., Beaver Dams, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/931,428

(22) Filed: May 13, 2020

(65) Prior Publication Data
US 2020/0361811 A1 Nov. 19, 2020

Related U.S. Application Data

(60) Provisional application No. 62/853,460, filed on May 28, 2019, provisional application No. 62/848,215, filed on May 15, 2019.

(51) Int. Cl.
*C03C 15/00* (2006.01)
*C03C 19/00* (2006.01)
*C04B 41/53* (2006.01)

(52) U.S. Cl.
CPC ............. *C03C 15/00* (2013.01); *C03C 19/00* (2013.01); *C04B 41/5353* (2013.01); *C03C 2203/52* (2013.01)

(58) Field of Classification Search
None
See application file for complete search history.

(56) References Cited

U.S. PATENT DOCUMENTS 3,883,337 A * 5/1975 Helgesson .............. C03C 12/00
65/31
4,721,549 A * 1/1988 Bogenschutz ...... C23C 18/1882
216/101

(Continued)

FOREIGN PATENT DOCUMENTS

JP 2003002685 A 1/2003
KR 10-1889667 B1 8/2018

OTHER PUBLICATIONS

International Search Report and Written Opinion of The International Searching Authority; PCT/US2020/032555; dated Aug. 28, 2020; 9 Pages; European Patent Office.

*Primary Examiner* — Shamim Ahmed
(74) *Attorney, Agent, or Firm* — John P. McGroarty (57) ABSTRACT

A method of modifying a substrate comprising an etching step comprising contacting one or more primary surfaces of a glass, glass-ceramic, or ceramic substrate with a solution for a time period of 20 minutes to 8 hours to generate one or more etched primary surfaces, the solution comprising over 10 percent by weight of one or more alkali hydroxides, the solution having a temperature within the range of 100° C. to 150° C., the substrate having a thickness between the primary surfaces that decreases during the time period by 5 μm to 100 μm at a rate of 2 μm per hour or greater. The solution of the etching step does not comprise hydrogen fluoride. The one or more alkali hydroxides of the solution of the etching step can be sodium hydroxide (NaOH), potassium hydroxide (KOH), or a combination of both sodium hydroxide and potassium hydroxide.

19 Claims, 8 Drawing Sheets

(56) References Cited

U.S. PATENT DOCUMENTS

| | | | |
|---|---|---|---|
| 6,388,375 B1* | 5/2002 | Pinckney | C03C 10/00 313/422 |
| 8,771,532 B2 | 7/2014 | Carlson et al. | |
| 9,140,543 B1 | 9/2015 | Allan et al. | |
| 2004/0045574 A1* | 3/2004 | Tan | C11D 11/0047 134/1 |
| 2004/0137828 A1* | 7/2004 | Takahashi | C03C 15/02 430/4 |
| 2005/0211673 A1* | 9/2005 | Kurachi | C03C 19/00 216/83 |
| 2009/0001315 A1 | 1/2009 | Ishikawa | |
| 2009/0004372 A1* | 1/2009 | Nasu | C23C 18/1844 427/126.2 |
| 2009/0280597 A1* | 11/2009 | Wijekoon | H01L 31/028 438/71 |
| 2013/0034670 A1 | 2/2013 | Hashimoto et al. | |
| 2013/0081951 A1* | 4/2013 | Hankey | C25D 11/16 205/50 |
| 2015/0143916 A1* | 5/2015 | Toller | G01N 21/8422 73/827 |
| 2015/0144613 A1* | 5/2015 | Guillemot | H05B 3/74 219/460.1 |
| 2015/0187965 A1* | 7/2015 | Stockum | H01L 21/461 438/98 |
| 2016/0313494 A1* | 10/2016 | Hamilton | G02B 5/0294 |
| 2017/0129806 A1 | 5/2017 | Fujii et al. | |
| 2018/0072619 A1 | 3/2018 | Kashima et al. | |
| 2018/0086662 A1 | 3/2018 | Luzzato et al. | |

\* cited by examiner

METHODS OF REDUCING THE THICKNESS OF TEXTURED GLASS, GLASS-CERAMIC, AND CERAMIC ARTICLES WITH HIGH CONCENTRATION ALKALI HYDROXIDE AT ELEVATED TEMPERATURE

CROSS-REFERENCE TO RELATED APPLICATIONS

This patent application claims priority under 35 U.S.C. § 119(e) to U.S. Provisional Patent Application No. 62/853,460, filed on May 28, 2019 and U.S. Provisional Patent Application No. 62/848,215 filed May 15, 2019, the entire disclosures of each are incorporated herein by reference.

FIELD

The present disclosure generally relates to methods of etching textured glass, glass-ceramic, and ceramic articles with non-HF processes that utilize elevated concentrations of alkali hydroxide and elevated temperatures.

BACKGROUND

Glass, glass-ceramic, and ceramic substrates are often used as front and back covers for display devices such as liquid crystal display (LCD) screens, tablets, smartphones, OLEDs, and touch screens. These substrates are advantageous in these applications due to their scratch resistance, strength, and resistance to various liquids and chemicals. In addition, the roughness of the primary surface(s) of the substrate can be increased (sometimes referred to as "textured") to improve tactile feel, to improve grip, and reduce fingerprint visibility during use. After the primary surfaces are textured, however, these textured surfaces are typically contacted with a solution (sometimes referred to as an "etchant") that reduces the thickness of the substrate at the textured surfaces in a process sometimes referred to as "etching." The etching of the textured surfaces is designed to rehabilitate the strength of the substrate, which may have suffered due to the texturing of the primary surface(s). However, there is a problem in that the typical etching process utilizes hydrofluoric (HF) acid, which is costly to dispose of, or basic (high pH) solutions, that have thus far proven to etch the textured surfaces at a rate that is too slow for commercial manufacturing purposes.

SUMMARY

The present disclosure solves that problem with an etching step that etches the textured surfaces of the substrate with an etching solution (a) containing an elevated concentration of alkali hydroxide (e.g., 10 percent by weight or greater) and (b) having an elevated temperature (e.g., 100° C. or greater). The elevated concentration and the elevated temperature synergistically increase the rate by which the solution etches the textured surfaces of the substrate in sufficient measure to be suitably fast for commercial manufacturing purposes. The elevated concentration and the elevated temperature synergistically increase the rate by which the solution etches even glass-ceramic substrates, although it may be beneficial to texture and etch the desired surfaces of a glass substrate and then subsequently transform the glass substrate into a glass-ceramic substrate in a ceramming step. The etching solution can further include additives to further increase the rate by which the solution etches the textured surfaces of the substrate. Further, via adjusting the concentration of the alkali hydroxide in the solution and the temperature of the solution, the rate by which the etching solution etches the textured surfaces of the substrate is tunable.

According to a first aspect of the present disclosure, a method of modifying a substrate comprises: an etching step comprising contacting one or more primary surfaces of a glass, glass-ceramic, or ceramic substrate with an etching solution for a time period of 20 minutes to 8 hours to generate one or more etched primary surfaces, the etching solution comprising over 10 percent by weight of one or more alkali hydroxides, the etching solution having a temperature within the range of 100° C. to 150° C., the substrate having a thickness between the primary surfaces that decreases during the time period by 5 μm to 100 μm at a rate of 2 μm per hour or greater. In embodiments, the method further comprises a texturing step, occurring before the etching step, the texturing step comprising increasing a surface roughness ($R_a$) of one or more of the primary surfaces of the substrate to generate one or more textured primary surfaces, and the etching step comprises contacting the one or more textured primary surfaces with the etching solution. In embodiments, increasing the surface roughness ($R_a$) comprises blasting the one or more of the primary surfaces with particles projected by pressurized gas. In embodiments, the substrate is a glass substrate, and the method further comprises a ceramming step, occurring after the etching step, the ceramming step comprising ceramming the glass substrate into a glass-ceramic substrate. In embodiments, the substrate is a glass-ceramic substrate. In embodiments, the etching solution does not comprise hydrogen fluoride. In embodiments, the etching solution further comprises one or more of an alkali metal phosphate salt, an alkali metal carbonate salt, and a chelating agent. In embodiments, the etching solution further comprises one or more of $Na_3PO_4$ and EDTA. In embodiments, the one or more alkali hydroxides of the etching solution is sodium hydroxide (NaOH), potassium hydroxide (KOH), or a combination of both sodium hydroxide and potassium hydroxide.

In another aspect of the present disclosure, a method of making a glass-ceramic substrate comprises: a texturing step comprising increasing a surface roughness ($R_a$) of one or more of the primary surfaces of a glass substrate to generate one or more textured primary surfaces; an etching step comprising contacting the one or more textured primary surfaces of the glass substrate with an etching solution for a time period of 20 minutes to 8 hours to generate one or more etched primary surfaces, the etching solution comprising over 10 percent by weight of one or more alkali hydroxides, the etching solution having a temperature within the range of 100° C. to 150° C., the substrate having a thickness between the two primary surfaces that decreases during the time period by 5 μm to 100 μm at a rate of 0.5 μm per hour or greater; and a ceramming step comprising ceramming the glass substrate into a glass-ceramic substrate. In embodiments, increasing the surface roughness ($R_a$) comprises blasting the one or more of the primary surfaces with particles projected by pressurized gas. In embodiments, the etching solution does not comprise hydrogen fluoride. In embodiments, the etching solution further comprises one or more of an alkali metal phosphate salt, an alkali metal carbonate salt, and a chelating agent. In embodiments, the etching solution further comprises one or more of $Na_3PO_4$ and EDTA. In embodiments, the one or more alkali hydroxides of the etching solution is sodium hydroxide (NaOH), potassium hydroxide (KOH), or a combination of both sodium hydroxide and potassium hydroxide.

According to yet another aspect of the present disclosure, a method of modifying a substrate comprises: a texturing step comprising increasing a surface roughness ($R_a$) of one or more primary surfaces of a glass, glass-ceramic, or ceramic substrate to generate one or more textured primary surfaces; and an etching step comprising contacting the one or more textured primary surfaces with an etching solution for a time period of 20 minutes to 8 hours to generate one or more etched primary surfaces, the etching solution comprising over 10 percent by weight of one or more alkali hydroxides, the etching solution having a temperature within the range of 100° C. to 150° C., the substrate having a thickness between the primary surfaces that decreases during the time period by 5 μm to 100 μm at a rate of 0.5 μm per hour or greater. In embodiments, the substrate is a glass substrate, and the method further comprises a ceramming step, occurring after the etching step, the ceramming step comprising ceramming the glass substrate into a glass-ceramic substrate. In embodiments, the etching solution of the etching step further comprises one or more of an alkali metal phosphate salt, an alkali metal carbonate salt, and a chelating agent. In embodiments, increasing the surface roughness ($R_a$) comprises blasting the one or more of the primary surfaces with particles projected by pressurized gas. In embodiments, the one or more alkali hydroxides of the etching solution is sodium hydroxide (NaOH), potassium hydroxide (KOH), or a combination of both sodium hydroxide and potassium hydroxide.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure as it is claimed.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following aspects.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Figure 1:
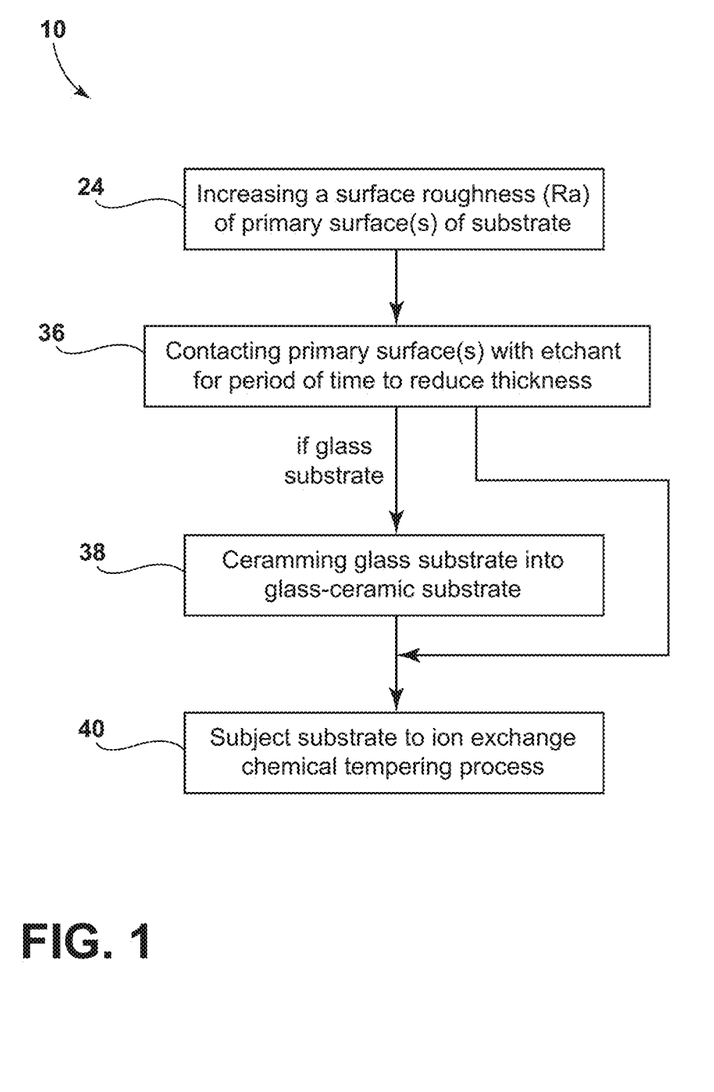
FIG. 1 is a flow chart schematic of a method of modifying a substrate, illustrating a texturing step whereby the surface roughness ($R_a$) of one or more of the primary surfaces of the substrate are increased to generate one or more textured primary surfaces, an etching step whereby the one or more textured primary surfaces are contacted with an etching solution to generate one or more etched primary surfaces, an optional ceramming step whereby the substrate, if a glass substrate, is cerammed into a glass-ceramic substrate, and an optional ion-exchange step whereby the substrate is chemically strengthened.
Figure 2:
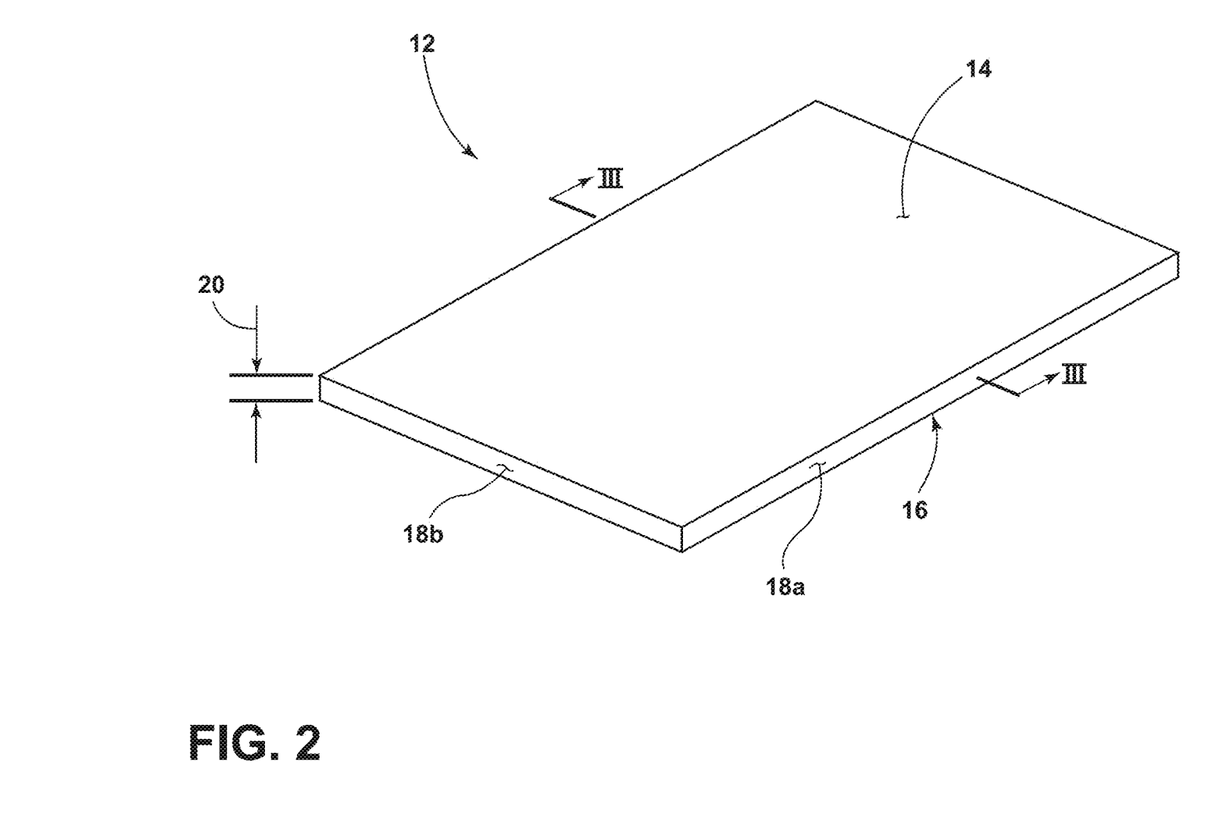
FIG. 2 is a perspective view of a substrate to be modified according to the method of FIG. 1, illustrating a pair of primary surfaces and a thickness bounded by the pair of primary surfaces.
Figure 3:
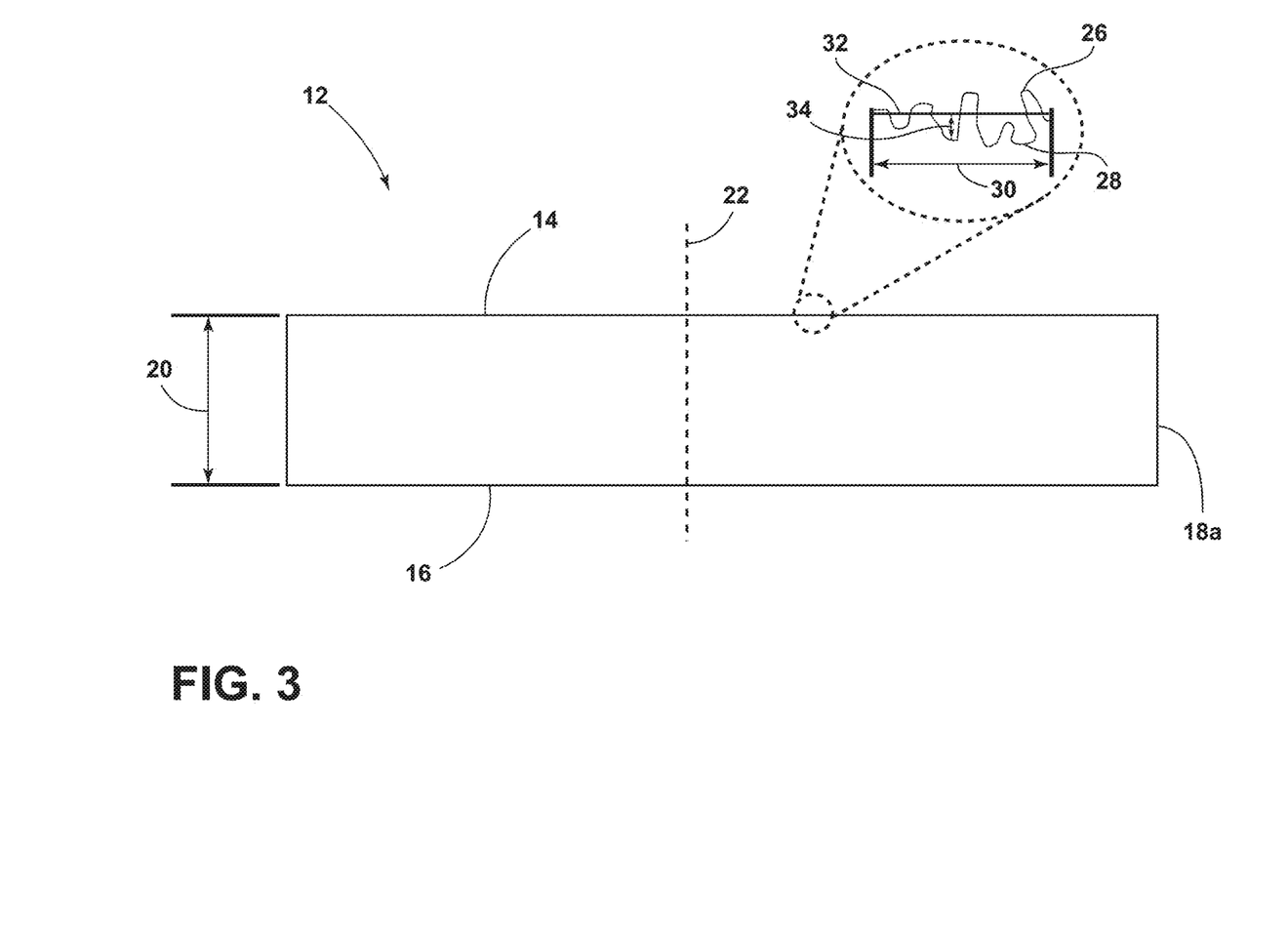
FIG. 3 is an elevational view of the cross-section taken through line III-III of FIG. 2, illustrating that the primary surfaces have a topology marked by peaks and valleys.

Referring now to FIGS. 1-3, a method 10 of modifying a substrate 12 is herein described. The substrate 12 modified by the method 10 includes primary surfaces 14, 16, side surfaces 18a, 18b . . . 18n extending between the primary surfaces 14, 16, and a thickness 20 bounded by the primary surfaces 14, 16. In embodiments, the primary surfaces 14, 16 are at least approximately planar, parallel to each other, and face in generally opposite directions. In other embodiments, the primary surfaces 14, 16 are not parallel. In any event, the thickness 20 is the shortest straight line distance between the two primary surfaces 14, 16. The thickness 20 can be measured with a micrometer or any other suitable measuring device. As discussed below, during an etching step, the method 10 decreases the thickness 20 of the substrate 12. The thickness 20 of the substrate 12 before and after the method 10 is measured at generally the same place, such as intersecting with a line 22 extending through an approximate center point "x" of the substrate 12. The substrate 12 has a bulk composition that is proximate to and includes the approximate center point "x" of the substrate 12.

In embodiments, the substrate 12 is a glass substrate, a glass-ceramic substrate, or a ceramic substrate. The terms "glass substrate," "glass-ceramic substrate," and "glass-ceramic substrate" are used in their broadest sense to include any substrate having a glass, glass-ceramic, and ceramic composition, respectively. In embodiments, the substrate 12, as a glass substrate or glass-ceramic substrate, is ion-exchangeable. To be ion-exchangeable, the substrate 12 includes a matrix and metal ions, such as alkali metal ions (e.g., lithium ions, sodium ions), within the matrix that are able to diffuse out of the matrix and into an ion-exchange medium, with the simultaneous diffusion of metal ions, such as alkali metal ions (typically larger, such as potassium ions) from the ion-exchange medium into the matrix.

In embodiments, the substrate 12 is a glass substrate with a bulk composition of about 40 mol % to 80 mol % silica and a balance of one or more other constituents, e.g., alumina, calcium oxide, sodium oxide, boron oxide, etc. In embodiments, the substrate 12 is a glass substrate selected from the group consisting of aluminosilicate glass, a borosilicate glass and a phosphosilicate glass. In embodiments, the substrate 12 is a glass substrate selected from the group consisting of aluminosilicate glass, a borosilicate glass, a phosphosilicate glass, a soda lime glass, an alkali aluminosilicate glass, and an alkali aluminoborosilicate glass.

In embodiments, the substrate 12 is a glass substrate, particularly an alkali aluminosilicate glass substrate, with a bulk composition that comprises alumina, at least one alkali metal and, in some embodiments, greater than 50 mol %, $SiO_2$, in other embodiments, at least 58 mol % $SiO_2$, and in still other embodiments, at least 60 mol % $SiO_2$, wherein the ratio ($Al_2O_3$ (mol %)+$B_2O_3$ (mol %))/Σ alkali metal modifiers (mol %)>1, where the modifiers are alkali metal oxides. In particular embodiments, the substrate 12 has a composition within the bulk that comprises, consists essentially of, or consists of: about 58 mol % to about 72 mol % $SiO_2$; about 9 mol % to about 17 mol % $Al_2O_3$; about 2 mol % to about 12 mol % $B_2O_3$; about 8 mol % to about 16 mol % $Na_2O$ and 0 mol % to about 4 mol % $K_2O$, wherein the ratio ($Al_2O_3$ (mol %)+$B_2O_3$ (mol %))/Σ alkali metal modifiers (mol %)>1, where the modifiers are alkali metal oxides.

In other particular embodiments, the substrate 12 has a bulk composition that comprises, consists essentially of, or consists of: about 61 mol % to about 75 mol % $SiO_2$; about 7 mol % to about 15 mol % $Al_2O_3$; 0 mol % to about 12 mol % $B_2O_3$; about 9 mol % to about 21 mol % $Na_2O$; 0 mol % to about 4 mol % $K_2O$; 0 mol % to about 7 mol % MgO; and 0 mol % to about 3 mol % CaO.

In other particular embodiments, the substrate 12 has a bulk composition that comprises, consists essentially of, or consists of: about 60 mol % to about 70 mol % $SiO_2$; about 6 mol % to about 14 mol % $Al_2O_3$; 0 mol % to about 15 mol % $B_2O_3$; 0 mol % to about 15 mol % $Li_2O$; 0 mol % to about 20 mol % $Na_2O$; 0 mol % to about 10 mol % $K_2O$; 0 mol % to about 8 mol % MgO; 0 mol % to about 10 mol % CaO; 0 mol % to about 5 mol % $ZrO_2$; 0 mol % to about 1 mol % $SnO_2$; 0 mol % to about 1 mol % $CeO_2$; less than about 50 ppm $As_2O_3$; and less than about 50 ppm $Sb_2O_3$; wherein 12 mol %≤$Li_2O$+$Na_2O$+$K_2O$≤20 mol % and 0 mol %≤MgO+Ca≤10 mol %.

In other particular embodiments, the substrate 12 has a bulk composition that comprises, consists essentially of, or consists of: about 64 mol % to about 68 mol % $SiO_2$; about 12 mol % to about 16 mol % $Na_2O$; about 8 mol % to about 12 mol % $Al_2O_3$; 0 mol % to about 3 mol % $B_2O_3$; about 2 mol % to about 5 mol % $K_2O$; about 4 mol % to about 6 mol % MgO; and 0 mol % to about 5 mol % CaO, wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)—$Al_2O_3$≤2 mol %; 2 mol %≤$Na_2O$—$Al_2O_3$≤6 mol %; and 4 mol %≤($Na_2O$+$K_2O$)—$Al_2O_3$≤10 mol %.

In other embodiments, the substrate 12 has a bulk composition that comprises $SiO_2$, $Al_2O_3$, $P_2O_5$, and at least one alkali metal oxide ($R_2O$), wherein 0.75>[($P_2O_5$ (mol %)+$R_2O$ (mol %))/$M_2O_3$ (mol %)]≤1.2, where $M_2O$=$Al_2O_3$+$B_2O_3$. In some embodiments, [($P_2O_5$ (mol %)+$R_2O$ (mol %))/$M_2O_3$ (mol %)]=1 and, in some embodiments, the glass does not include $B_2O_3$ and $M_2O_3$=$Al_2O_3$. In other embodiments, the substrate 12 has a bulk composition that comprises: about 40 to about 70 mol % $SiO_2$; 0 to about 28 mol % $B_2O_3$; about 0 to about 28 mol % $Al_2O_3$; about 1 to about 14 mol % $P_2O_5$; and about 12 to about 16 mol % $R_2O$. In other embodiments, the substrate 12 has a bulk composition that comprises: about 40 to about 64 mol % $SiO_2$; 0 to about 8 mol % $B_2O_3$; about 16 to about 28 mol % $Al_2O_3$; about 2 to about 12 mol % $P_2O_5$; and about 12 to about 16 mol % $R_2O$. In other embodiments, the substrate 12 has a bulk composition that comprises at least one alkaline earth metal oxide such as, but not limited to, MgO or CaO.

In other embodiments, the substrate 12 has a bulk composition that is substantially free of lithium; i.e., the composition within the bulk comprises less than 1 mol % $Li_2O$ and, in other embodiments, less than 0.1 mol % $Li_2O$ and, in other embodiments, 0.01 mol % $Li_2O$, and in still other embodiments, 0 mol % $Li_2$. In some embodiments, such compositions are free of at least one of arsenic, antimony, and barium; i.e., the bulk composition comprises less than 1 mol % and, in other embodiments, less than 0.1 mol %, and in still other embodiments, 0 mol % of $As_2O_3$, $Sb_2O_3$, and/or BaO.

In embodiments, the substrate 12 is a glass-ceramic substrate. Examples of suitable glass-ceramic substrates include $Li_2O$—$Al_2O_3$—$SiO_2$ system (i.e. LAS-System) glass-ceramics, MgO—$Al_2O_3$—$SiO_2$ system (i.e. MAS-System) glass-ceramics, and/or glass-ceramics that include a predominant crystal phase including β-quartz solid solution, β-spodumene ss, cordierite, and lithium disilicate. The crystal phase can include a single crystal, which may include $Al_2O_3$. Such single crystal phase substrates are referred to as sapphire. Other suitable materials for a crystalline substrate include polycrystalline alumina layer and/or spinel ($MgAl_2O_4$).

In embodiments, the thickness 20 of the substrate 12 is between 50 μm and 5 mm. Suitable examples of the thickness 20 fall within the range of 50 μm to 500 μm, such as 50 μm, 100 μm, 200 μm, 300 μm, 400 μm, and 500 μm). Further suitable examples of the thickness 20 fall within the range of 500 µm to 1.1 mm, such as 500 µm, 600 µm, 700 µm, 800 µm, 900 µm, 1 mm, and 1.1 mm. The thickness 20 of the substrate 12 can be greater than 1.1 mm, such as 2 mm, 3 mm, 4 mm, and 5 mm.

Referring back to FIG. 1, in embodiments, the method 10 includes a texturing step 24. The texturing step 24 comprises increasing a surface roughness ($R_a$) of one or more of the primary surfaces 14, 16 of the substrate 12 to generate one or more textured primary surfaces 14, 16. One way to determine surface roughness ($R_a$) of the surface is to obtain a profile of the surface showing the various peaks 26 (a/k/a asperities) and valleys 28 defining the profile, such as that illustrated in FIG. 3, which is a two-dimensional slice of an area of the substrate 12. The two-dimensional slice can have a length 30. A mean line 32 (also referred to as a center line) is generated. The mean line 32 is a straight horizontal line generated from calculating a weighted average for each data point (n) representing the primary surface 14 along the length 30 resulting in equal areas above and below the line. A vertical distance ($y_i$) 34 from the mean line 32 for each data point representing the surface along the length 30 is then determined. The data points (n) are equally spaced. The surface roughness ($R_a$) is the arithmetic average of the absolute values of those vertical distances ($y_i$) 34. An equation for surface roughness ($R_a$) using those variables is presented immediately below.

$$R_a = \frac{1}{n}\sum_{i=1}^{n}|y_i|$$

Practically, the surface roughness ($R_a$) can be determined using an interferometer, such as the ZYGO® NEWVIEW 7300 Optical Surface Profiled, manufactured by ZYGO® Corporation (Middlefield, Conn., USA).

After the texturing step 24 of the method 10, the surface roughness ($R_a$) of the one or more textured primary surfaces 14, 16 of the substrate 12 is greater than before the texturing step 24. In embodiments, after the texturing step 24, the surface roughness ($R_a$) of the one or more textured primary surfaces 14, 16 is within the range of 5 nm to 1 µm. In embodiments, after the texturing step 24, the surface roughness ($R_a$) of the one or more textured primary surfaces 14, 16 is within the range of 500 nm to 1 µm. In embodiments, after the texturing step 24, the surface roughness ($R_a$) of the one or more textured primary surfaces 14, 16 is within the range of from 500 nm to 10000 nm, from 500 nm to 5000 nm, or from 500 nm to 2500 nm. In embodiments, after the texturing step 24, the surface roughness ($R_a$) of the one or more textured primary surfaces 14, 16 is 500 nm, 600 nm, 700 nm, 800 nm, 900 nm, 1000 nm, 1250 nm, 1500 nm, 1750 nm, 2000 nm, 2250 nm, 2500 nm, 2750 nm, 3000 nm, 4000 nm, 5000 nm, or 10000 nm, or within a range falling between any of those values.

The surface roughness ($R_a$) of the one or more primary surfaces 14, 16 can be increased through a variety of processes. For example, one or more of the primary surfaces 14, 16 of the substrate 12 can be blasted with particles projected by pressurized gas (e.g., air) in a process commonly referred to as sand blasting or grit blasting. In embodiments, the particles have a diameter within the range of 15 µm to 100 µm. In embodiments, the particles have a grit size within the range of 200 grit to 500 grit. In embodiments, the pressure of the pressurized air is within the range of 10 psi to 100 psi, and in embodiments, within the range of 20 psi to 90 psi. In embodiments, the particles comprise silicon carbide or alumina ($Al_2O_3$). In embodiments, increasing the surface roughness ($R_a$) of one or more of the primary surfaces 14, 16 of the substrate 12 is achieved with blasting the primary surface 14 in one pass. In other embodiments, increasing the surface roughness ($R_a$) of one or more of the primary surfaces 14, 16 of the substrate 12 is achieved with blasting one or more of the primary surfaces 14, 16 in multiple passes. In embodiments, the particles projected by the pressurized gas have a flow rate of 12 inches per 68 seconds.

The method 10 further comprises an etching step 36. The etching step 36 comprises contacting the one or more textured primary surfaces 14, 16 of the substrate 12 with an etching solution for a time period of 20 minutes to 8 hours to generate one or more etched primary surfaces 14,16. The etching solution comprises over 10 percent by weight of one or more alkali hydroxides. In embodiments, the solution is an aqueous solution that comprises over 10 percent by weight of one or more alkali hydroxides dissolved in water (such as deionized water). In embodiments, the etching solution has a temperature within the range of 100° C. to 150° C. Because of the etching solution contacting the one or more textured primary surfaces 14, 16, the thickness 20 between the textured surfaces 14, 16 decreases during the time period of the etching step 36 by 5 µm to 100 µm at a rate of 0.5 µm per hour or greater. In embodiments, the alkali hydroxide is sodium hydroxide (NaOH), potassium hydroxide (KOH), or a combination of both sodium hydroxide and potassium hydroxide. If the texturing step 24 is performed, then the texturing step 24 is performed before the etching step 36.

"Contacting" or like terms refer to a close physical touching that can result in a physical change, a chemical change, or both, to at least one touched entity. Contacting the one or more textured primary surfaces 14, 16 of the substrate 12 can involve, for example, selective partial or complete dipping, spaying, immersion, and like treatments, or a combination of treatments, with the etching solution. In embodiments, the etching solution is made to contact the one or more of the textured primary surfaces 14, 16 via spraying the solution onto the one or more textured primary surfaces 14, 16. In embodiments, the etching solution is made to contact the one or more textured primary surfaces 14, 16 via immersing the substrate 12 into a container that contains the solution (e.g., a bath). If it is desired that one or more of the one or more textured primary surfaces 14, 16 not contact the solution, then a protective coating can be placed over (such as adhered) to such surfaces before the substrate 12 is contacted with the solution. The protective coating can be an insoluble non-porous coating such as an acrylic wax, or a laminate film having an adhesive layer, for example, an acrylic, a silicone, and like adhesives materials, or combinations thereof. Coating application methods can include, for example, brushing, rolling, spraying, laminating, and like methods. The insoluble non-porous protective coating survives contacting the etching solution and can be readily removed after the time period of the etching step 36 has concluded. Removing the protective coating can be accomplished using any suitable method, such as contacting the protective coating with a dissolving liquid, heating the coating to liquefy and drain, and like methods and materials, or a combination thereof.

The texturing step 24 can create defects, sub-surface flaws, and other crack-initiating features, which reduce the strength of the substrate 12. The etching step 36 reduces the presence and extent of the flaws generated during the texturing step 24. Accordingly, after the etching step 36, the substrate 12 can have a strength that is equal to or just less than the strength of the substrate 12 before the texturing step 24. Strength can be determined in a variety of ways, such as "The Ring-on-Ring Test" performed according to the ASTM C-1499-15 standard test method for Monotonic Equibiaxial Flexural Strength of Advanced Ceramics at Ambient Temperatures, which predicts the probability failure for a ring-on-ring ("ROR") peak failure load.

In an embodiment, a target decrease of the thickness 20 between the one or more textured primary surfaces 14, 16 to be achieved during the etching step 36 is predetermined. For example, if only the primary surface 14 was textured during the texturing step 24, then it can be predetermined to contact that textured primary surface 14 with the etching solution to decrease the thickness 20 of the substrate 12 by 5 µm to 40 µm (such as between 10 µm to 30 µm, or 20 µm). As another example, if both of the primary surfaces 14, 16 were textured during the texturing step 24, then it can be predetermined to contact both textured primary surfaces 14, 16 with the solution to decrease the thickness 20 of the substrate 12 by 10 µm to 80 µm (such as between 20 µm to 60 µm, or 30 µm to 50 µm, or 40 µm). In any event, in embodiments, the predetermined target reduction of the thickness 20 is sufficient to rehabilitate the strength of the substrate 12 to an acceptable level, such as a strength equal to or slightly less than the strength of the substrate 12 before the texturing step 24. The minimum reduction of the thickness 20 to rehabilitate the strength of the substrate 12 may be a function of what strength is determined to be acceptable. The minimum reduction thickness can then be determined experimentally through trial and error. For example, a 21 µm reduction of the thickness 20 may not sufficiently restore the strength of the substrate 12, but a 25 µm reduction of the thickness 20 might sufficiently rehabilitate the strength of the substrate 12.

In embodiments, the time period that the etching solution contacts the one or more textured primary surfaces 14, 16 of the substrate 12 is predetermined. For example, manufacturing constraints might limit the time period to 8 hours, between 4 hours and 8 hours, between 2 hours and 4 hours, or some other time period. Small desired decreases of the thickness 20 during the etching step 36 might require shorter periods of time, such as between 20 minutes and 1 hour, or between 30 minutes and 45 minutes. In embodiments, the time period is chosen to provide a rate of decrease of the thickness 20 that is fast enough to be commercially viable but slow enough to be able to reproduce within desired tolerances. For example, if the targeted decrease in the thickness 20 of the substrate 12 is 20 µm and if the etching solution reduces the thickness 20 at a rate of 5 µm per hour, then the time period would be 4 hours, which might be considered both commercially viable and slow enough to be able to reproduce within desired tolerances. However, if the targeted decrease in the thickness 20 of the substrate 12 is 20 µm and if the etching solution reduces the thickness 20 at a rate of 600 µm per hour, then the time period would be 2 minutes, which might be considered fast enough for commercial manufacturing purposes but too fast to be able to reproduce within desired tolerances. In embodiments, the rate of decrease of the thickness 20 during the etching step 36 is at least 2 µm per hour, such as at least 5 µm per hour. In embodiments, the rate of decrease of the thickness 20 during the etching step 36 is 2 µm/hr, 3 µm/hr, 4 µm/hr, 5 µm/hr, 10 µm/hr, 15 µm/hr, 20 µm/hr, 30 µm/hr, 40 µm/hr, 50 µm/hr, 60 µm/hr, 70 µm/hr, 80 µm/hr, 90 µm/hr, 100 µm/hr, and ranges between any two of those values, such as within the ranges of 2 µm per hour to 50 µm per hour, 4 µm per hour to 50 µm per hour, 5 µm per hour to 50 µm per hour, 4 µm per hour to 40 µm per hour, 5 µm per hour to 30 µm per hour, and so on.

The solution comprising over 10 percent by weight of one or more alkali hydroxides at a temperature within the range of 100° C. to 150° C. provides a sufficiently high rate of reduction of the thickness 20 of the substrate 12 to be feasible for commercial manufacturing purposes, even if the substrate 12 is relatively resistant to liquid etching such as a glass-ceramic substrate and a ceramic substrate. In general, the higher the percentage by weight of the one or more alkali hydroxides and the higher the temperature of the etching solution within the range of 100° C. to 150° C., the higher the rate of reduction of the thickness 20 of the substrate 12.

The weight percentage of the one or more alkali hydroxides in the etching solution and the temperature of the etching solution are surprisingly synergistic. The higher the concentration of the one or more alkali hydroxides in the etching solution, the higher the boiling point of the solution and thus the higher the temperature that the etching solution can be. The higher the temperature that the etching solution is, the greater the rate of reduction of the thickness 20 of the substrate 12. Further, the higher the concentration of the one or more alkali hydroxides in the etching solution, the more readily the one or more alkali hydroxides can interact with the one or more textured primary surfaces 14, 16 of the substrate 12 to reduce the thickness of the substrate 12. Thus, the higher the concentration of the one or more alkali hydroxides in the etching solution thus both (1) increases the rate of reduction of the thickness 20 of the substrate 12 and (2) increases the boiling point of the etching solution allowing the etching solution to be at a higher temperature without boiling, which further increases the rate of reduction of the thickness 20 of the substrate 12. The discovery of this dual and synergistic effect is especially beneficial for reducing the thickness 20 of the substrate 12 when the substrate 12 is a glass-ceramic or ceramic substrate, which heretofore have been too resistant to non-HF wet etching techniques to be commercially feasible.

The etching solution having a temperature within the range of 100° C. to 150° C. is important to solve the problems identified above. If the temperature of the etching solution is below 100° C., then the etching solution will not reduce the thickness 20 of the substrate 12 at a rate that is quick enough to be commercially practicable, especially when the substrate 12 is a glass-ceramic substrate or a ceramic substrate. If the temperature of the etching solution is above 150° C., then the etching solution will boil and evaporate before the thickness 20 of the substrate 12 is reduced sufficiently.

The etching solution comprising over 10 percent by weight of one or more alkali hydroxides is also important to solve the problems identified above. If the etching solution has less than 10 percent by weight of one or more alkali hydroxides, then the rate at which the etching solution reduces the thickness of the substrate 12 will likely be insufficient for commercial manufacturing purposes, regardless of the temperature of the etching solution. The upper limit of the concentration of the one or more alkali hydroxides is limited primarily by the solubility of the one or more alkali hydroxides at the temperature of the etching solution. In embodiments, the etching solution comprises the one or more alkali hydroxides in concentrations of 10 wt. %, 15 wt. %, 20 wt. %, 25 wt. %, 30 wt. %, 35 wt. %, 40 wt. %, 45 wt. %, 50 wt. %, 55 wt. %, 60 wt. %, and ranges of concentrations between any two of those concentrations, such as 10 wt. % to 50 wt. %, 15 wt. % to 50 wt. %, 15 wt.

% to 40 wt. %, 10 wt. % to 40 wt. %, 20 wt. % to 50 wt. %, 25 wt. % to 40 wt. %, and so on.

At the conclusion of the time period, the etching solution is made to no longer contact the substrate 12. For example, if the substrate 12 is made to contact the etching solution by immersing the substrate 12 in a bath of the etching solution, then the substrate 12 is removed from the bath. The substrate 12 can then be rinsed with water (such as deionized water) and dried.

To determine the thickness 20 of the substrate 12 after the etching solution has reduced the thickness 20 of the substrate 12 during the etching step 36, the thickness 20 can be measured with a micrometer, as discussed above. Alternatively, the thickness 20 can be estimated by comparing the mass of the substrate 12 before the etching step 36 with the mass of the substrate 12 after the etching step 36. The decrease in thickness 20 of the substrate 12 will be proportional to the decrease in mass of the substrate 12. For example, if the thickness 20 of the substrate 12 before the etching step 36 was 1 mm, and the mass of the substrate 12 before the etching step 36 was 10 grams, and the mass of the substrate 12 after the etching step 36 is 9 grams for a mass loss of 1 gram, then it can be estimated that the decrease in thickness 20 during the etching step 36 was 100 nm (0.1 mm) from the equation below:

$$\Delta \text{thickness} = \text{initial thickness} * \frac{\Delta \text{mass}}{\text{initial mass}}$$

The greater the surface area of the one or more textured primary surfaces 14, 16 contacting the etching solution compared to non-primary surfaces contacting the solution (such as exposed side surfaces 18a, 18b, ... 18n), the greater the accuracy of the estimation.

In embodiments, the etching solution further comprises one or more of an alkali metal phosphate salt, an alkali metal carbonate salt, and a chelating agent. When added to the etching solution as "additives," these constituents increase the rate at which the etching solution reduces the thickness 20 of the substrate 12. In embodiments, the one or more of the alkali metal phosphate salt, the alkali metal carbonate salt, and the chelating agent have a concentration in the etching solution of within the ranges of 0.1 wt. % to 20 wt. %, 0.1 wt. % to 15 wt. %, 0.1 wt. % to 10 wt. %, 0.1 wt. % to 5 wt. %, or 1.5 wt. % to 5.5 wt. %. According to one embodiment, the alkali metal phosphate salt is one or more of the inorganic ortho- or pyro-phosphate salts with sodium and potassium ions including, but not limited to, sodium phosphates such as $Na_3PO_4$ and $Na_4P_2O_7$, and potassium phosphates such as $K_3PO_4$ and $K_4P_2O_7$. According to another embodiment, the alkali metal phosphate salt is one or more of $Na_2CO_3$ and $K_2CO_3$. The phosphate ions and carbonate ions are thought to bond with lithium ions that the etching solution removes from the substrate 12 and precipitates out of the etching solution. In some implementations, the chelating agent is one or more of ethylenediaminetetraacetic acid (EDTA), nitrilotriacetic acid (NTA), citric acid, salicylic acid, glycine, oxalic acid, disodium EDTA, dipotassium EDTA, trisodium NTA, and tripotassium NTA. The chelating agents are thought to chelate with multi-valence metal ions from the substrate 12, such as aluminum ions. In some embodiments, the etching solution further comprises one or more of $Na_3PO_4$ and EDTA.

As detailed herein, the etching solution does not comprise hydrogen fluoride, whether in aqueous form (hydrofluoric acid) or otherwise. The etching solution used in the etching step 36 reduces the thickness 20 of the substrate 12 in the etching step 36 sufficiently fast for commercial production purposes, even if the substrate 12 is a glass-ceramic or a ceramic substrate. Because of the discoveries as disclosed herein, the use of hydrogen fluoride as in an etching solution to reduce the thickness 20 of the substrate 12, and associated issues arising from using hydrogen fluoride, are avoided.

In embodiments, where the substrate 12 is a glass substrate, then the method 10 optionally further comprises a ceramming step 38. The ceramming step 38 comprises transforming the substrate 12 into a glass-ceramic substrate. In embodiments, the ceramming step 38 occurs after the texturing step 24 and the etching step 36. Performing the texturing step 24 and the etching step 36 while the substrate 12 is in glass form, and then subsequently performing the ceramming step 38 recognizes that the etching solution reduces the thickness 20 of a glass-ceramic substrate or a ceramic substrate more slowly than a glass substrate, assuming all other conditions of the etching step 36 are held constant (e.g., concentration of the one or more alkali hydroxides in the etching solution, temperature of the etching solution, etc.).

Ceramming of the substrate 12, as a glass substrate, can be achieved according to various heat treatment temperatures and durations, as would be understood by those of ordinary skill in the field of the disclosure based on the particular composition of the substrate 12. For example, the substrate 12 at the ceramming step 38 can be subjected to temperatures of 570° C. for 2 hours and 740° C. for 1 hour, as suitable to convert the substrate 12, as a glass substrate, into a glass-ceramic substrate. A furnace can be utilized. The ceramming step 38 is not thought to significantly alter the surface roughness ($R_a$) of the substrate 12 as existing after the etching step 36.

In embodiments, the method 10 optionally further comprises an ion-exchange step 40. The ion-exchange step 40 comprises subjecting the substrate 12 to an ion-exchange chemical tempering process (chemical tempering is often referred to as "chemical strengthening"). In the ion-exchange chemical tempering process, ions at or near the primary surfaces 14, 16 of the substrate 12 are replaced by—or exchanged with—larger ions usually having the same valence or oxidation state. In embodiments, ions at or near the primary surfaces 14, 16 in the surface layer of the substrate 12 and the larger ions are monovalent alkali metal cations, such as $Na^+$ (when $Li^+$ is present in the substrate 12), $K^+$, $Rb^+$, and $Cs^+$. Alternatively, monovalent cations at, or near the primary surfaces 14, 16 may be replaced with monovalent cations other than alkali metal cations, such as $Ag^+$ or the like.

In embodiments, the ion-exchange step 40 is carried out by immersing the substrate 12 in a molten salt bath containing the larger ions to be exchanged with the smaller ions in the substrate 12. It will be appreciated by those skilled in the art that parameters for the ion-exchange process, including, but not limited to, bath composition and temperature, immersion time, the number of immersions of the substrate 12 in a salt bath (or baths), use of multiple salt baths, and additional steps such as annealing, washing and the like, are generally determined by the composition of the substrate 12 and the desired compressive stress profile of the substrate 12 that result from the strengthening operation. By way of example, ion-exchange of alkali metal-containing glass substrates may be achieved by immersion in at least one molten bath containing a salt such as, but not limited to, nitrates, sulfates, and chlorides of the larger alkali metal ion. In embodiments, the molten salt bath is an alkali nitrate molten salt bath comprising potassium nitrate and sodium nitrate having a combined concentration in a range of 88 wt. % to 100 wt. %. In embodiments, the molten salt bath comprises potassium nitrate (0-100 wt. %), sodium nitrate (0-100 wt. %), and lithium nitrate (0-12 wt. %), the combined potassium nitrate and sodium nitrate having a weight percentage within the range of 88 wt. % to 100 wt. %. In embodiments, the temperature of the molten salt bath typically is in a range from about 350° C. up to about 500° C., while immersion times range from about 15 minutes up to about 40 hours, including from about 20 minutes to about 10 hours. However, temperatures and immersion times different from those described above may also be used. In embodiments where the substrate 12 at the ion-exchange step 40 is a MAS-System glass-ceramic substrate, then the ion-exchange chemical tempering process can include contacting the substrate 12 with $Li_2SO_4$ molten salt, whereby an exchange of $2Li^+$ for $Mg^{2+}$ can occur.

Figure 4:
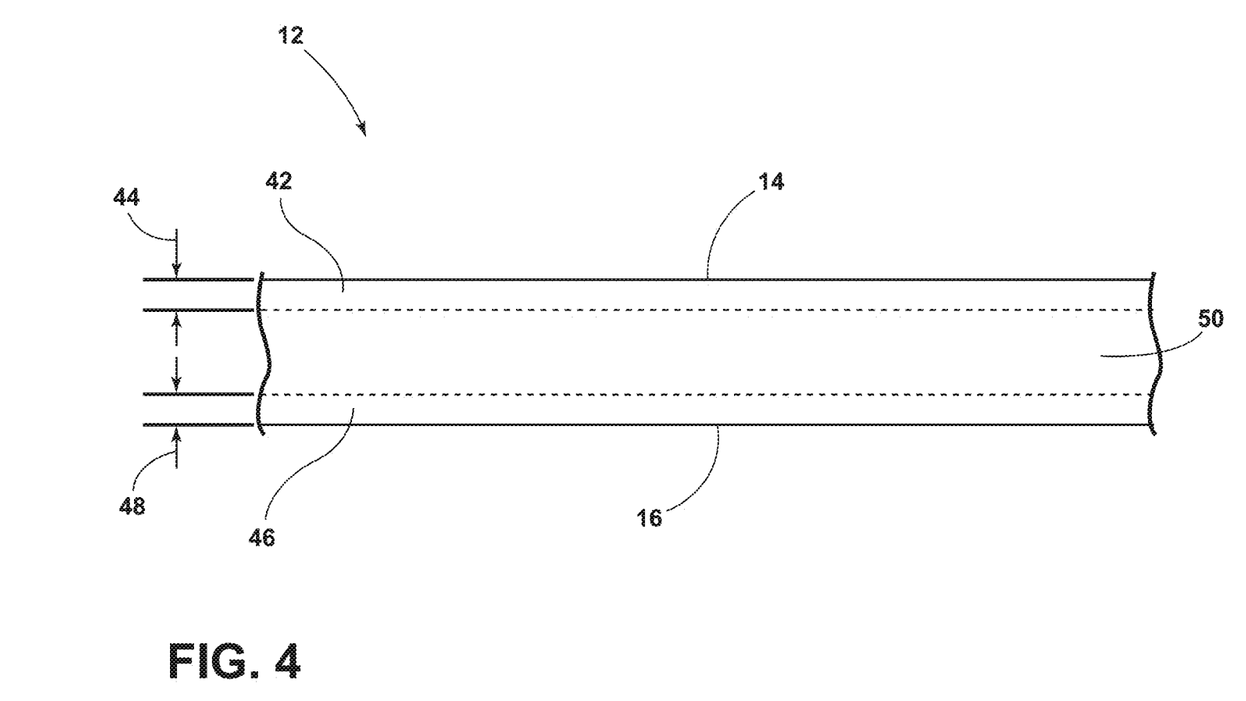
FIG. 4 is another elevational view of the cross-section taken through line III-III of FIG. 2, but after the substrate has been modified pursuant to the ion-exchange step of the method of FIG. 1, illustrating regions of compressive stress continuous with the primary surfaces, and a region of tensile stress between the regions of compressive stress.
Figure 5A:
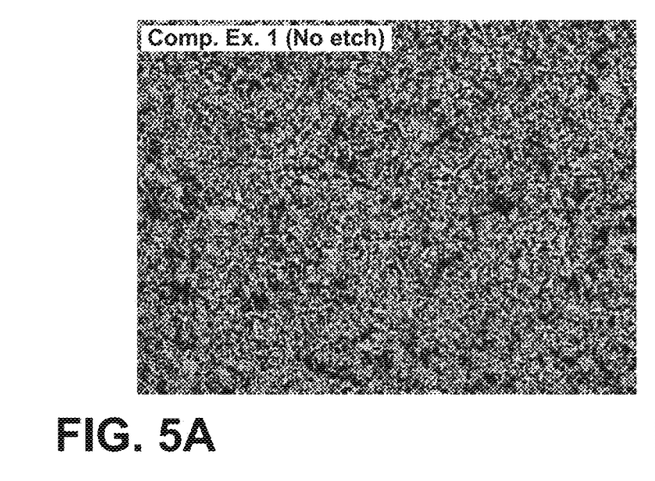
FIGS. 5A-5D are optical micrographs of substrates that have been modified by solely the texturing step of the method of FIG. 1 (see FIG. 5A), or that have been modified by both the texturing step and the etching step of the method of FIG. 1 (see FIGS. 5B-5D), illustrating the change in surface topology.
Figure 5B:
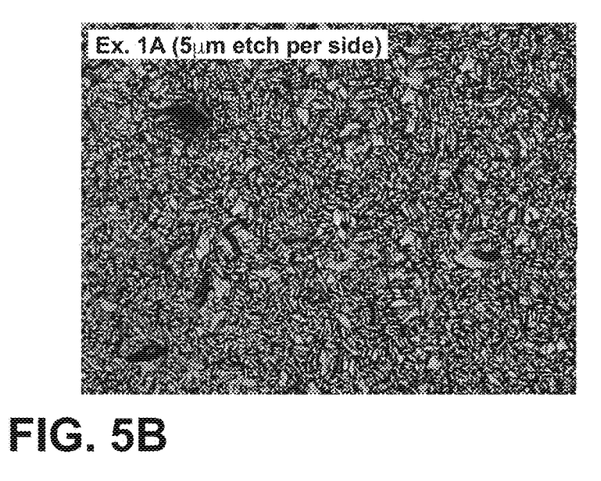
Figure 5C:
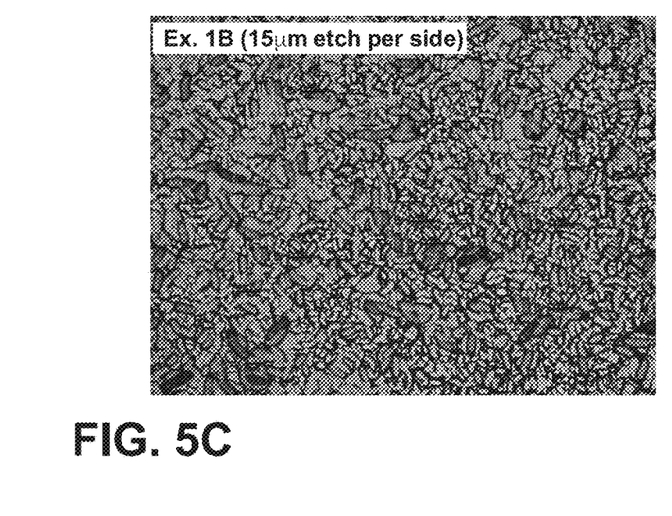
Figure 5D:
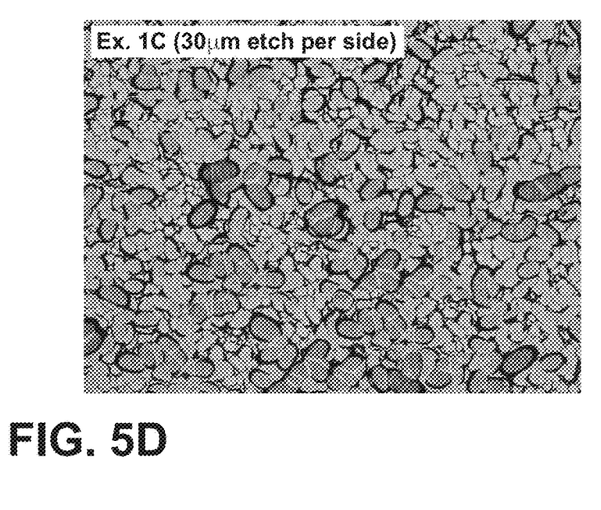

Referring now additionally to FIG. 4, the ion-exchange step 40 generates a region 42 of the substrate 12, contiguous with the primary surface 14, that is under compressive stress ("CS"). The region 42 extends from the primary surface 14 to a depth of compression 44. The step 40 can also generate a second region 46 of the substrate 12, contiguous with the primary surface 16, that is under compressive stress. The second region 46 extends from the primary surface 16 to a second depth of compression 48. This generation of compressive stress at the regions 42, 46 further creates a central region 50 that is under a tensile stress, having a maximum value at the center of the central region 50 (such as at "x"), referred to as central tension or center tension (CT). The central region 50 extends between the depths of compression 44, 48, and is under tensile stress. The tensile stress of the central region 50 balances or counteracts the compressive stresses of the regions 42, 46. As used herein, the terms "depth of compression" and "DOC" refer to the depth at which the stress within the substrate 12 changes from compressive to tensile stress. At the depths of compression 44, 48, the stress crosses from a positive (compressive) stress to a negative (tensile) stress and thus has a value of zero. In embodiments, the depths of compression 44, 48 are each at least 20 μm into the substrate 12 from the primary surfaces 14, 16, respectively.

Two methods for extracting detailed and precise stress profiles (stress as a function of depth) for a substrate with regions under compressive stress are disclosed in U.S. Pat. No. 9,140,543, entitled "Systems and Methods for Measuring the Stress Profile of Ion-Exchanged Glass, filed by Douglas Clippinger Allan et al. on May 3, 2012, and claiming priority to U.S. Provisional Patent Application No. 61/489,800, having the same title, and filed on May 25, 2011, the contents of which are incorporated herein by reference in their entirety.

In embodiments, the absolute value of the maximum compressive stress CS within the regions 42, 46 is at least 200 MPa, up to about 400 MPa, or up to about 1000 MPa. In some embodiments, the maximum compressive stress CS is located at the primary surfaces 14, 16. In other embodiments, however, the maximum compressive stress CS may be located in the compressive stress regions 42, 46 at some depth below the primary surfaces 14, 16.

The "depth of layer" ("DOL"), not to be confused with the depth of compression, is the depth of the regions 42, 46 under compressive stress as determined by surface stress meter (FSM) measurements using commercially available instruments such as the FSM-6000 (Luceo Co., Ltd., Tokyo, Japan). Methods of measuring compressive stress at the primary surfaces 14, 16 and the depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. In embodiments, the measured depths of layer are at least 5 μm. In some embodiments, the primary surfaces 14, 16 of the substrate 12 described herein, when strengthened by ion-exchange at step 40, have a compressive stress of at least 350 MPa, and the regions 42, 46 under compressive stress have a measured depth of layer of at least 15 μm.

If the ion-exchange step 40 is performed before the texturing step 24 and the etching step 36, then the latter texturing and etching steps 24, 36 would remove a portion of the regions 42, 46 under compressive stress, which counters the purpose of the ion-exchange step 40. Therefore, a preference exists for performing the ion-exchange step 40 after the texturing and etching steps 24, 36. However, in other embodiments, the ion-exchange step 40 creates sufficiently thick compressive stress regions 42, 46 to allow for subsequent removal of portions thereof during subsequent texturing and etching steps 24, 36.

The substrate 12 resulting from the method 10 described herein is suitable for many applications. Those applications include, but are not limited to, front and back covers for display devices such as LCD screens, tablets, smartphones, OLEDs, and touch screens. The substrate 12 used in those applications provide improved tactile feel, improved grip, and reduced fingerprint visibility.

EXAMPLES

The following examples describe various features and advantages provided by the disclosure, and are in no way intended to limit the invention and appended claims.

Example 1

According to this example, four samples of a substrate 12, a glass substrate, were prepared (Comp. Ex. 1, Ex. 1A, Ex. 1B, and Ex. 1C). The substrate 12 had a composition within the bulk consistent with those outlined earlier in the disclosure. According to the texturing step 24 of the method 10, the surface roughness ($R_a$) of both of the primary surfaces 14, 16 of all four samples of the substrate 12 were increased by sand blasting the samples with 220 grit SiC particles having an average diameter of 63 μm at an air pressure of 60 psi. Subsequently, the etching step 36 was performed on three of the samples (Exs. 1A-1C). The etching step 36 included contacting the textured primary surfaces 14, 16 of those samples with an aqueous etching solution comprising 25 wt. % NaOH and having a temperature of 110° C. The etching step 36 caused a reduction in the thickness 20 of the samples. More specifically, the etching solution contacted the textured primary surfaces 14, 16 of the three samples for a time period sufficient to reduce the thickness 20 of those samples by 5 μm, 10 μm, and 30 μm per side of the sample, respectively. In other words, the thickness 20 of sample Ex. 1A was reduced by 10 μm (5 μm of thickness 20 being removed from each of the primary surfaces 14, 16), and so on. The thickness 20 of the comparative sample (Comp. Ex. 1) was not reduced according to the etching step 36.

Referring now to FIGS. 5A-5D, optical micrographs of the resulting samples are depicted. As is evident from the micrograph of the comparative sample (Comp. Ex. 1) shown in FIG. 5A, the texturing step 24 produced a highly-roughened primary surface 14 with numerous peaks 26 and valleys 28. In contrast, the micrographs in FIGS. 5B-5D of the samples (Exs. 1A-1C) that were subsequently subjected to the etching step 36 for progressively longer durations show the etched primary surface 14 having progressively less peaks 26 and valleys 28 than the comparative sample (Comp. Ex. 1). The greater the time period of the etching step 36, the less peaks 26 and valleys 28 at the etched primary surface 14 of the sample.

Example 2

According to this example, four substrates 12 were prepared, namely a Glass A (Ex. 2A), a Glass B (Ex. 2B), a Glass C (Ex. 2C), and a Glass-Ceramic C (Ex. 2D). Five samples of each of the four substrates 12 were then prepared, for a total of twenty samples. The compositions of the substrates 12 Glass A, Glass B, and Glass C at the bulk were consistent with those outlined above. The composition of the substrate 12 Glass-Ceramic C was consistent with those outlined above, and was cerammed from a substrate 12 having the same composition as Glass C. According to the texturing step 24 of the method 10, the surface roughness ($R_a$) of all twenty of the samples was increased via sand blasting consistent with those parameters disclosed earlier in the disclosure, generating textured primary surfaces 14, 16. Subsequently, according to the etching step 36 of the method 10, the textured primary surfaces 14, 16 of all twenty samples were contacted with an aqueous etching solution comprising at least 10 percent by weight of an alkali hydroxide (sodium hydroxide, NaOH) and having a temperature of at least 100° C. More specifically, the textured primary surfaces 14, 16 of each sample from each of the substrates 12 were contacted with the etching solution having different concentrations of sodium hydroxide and a different temperature. Those concentrations and temperatures were (1) 10 percent by weight and 101° C., (2) 20 percent by weight and 107.1° C., (3) 30 percent by weight and 116.7° C., (4) 40 percent by weight and 128.8° C., and (5) 50 percent by weight and 132.5° C. The rate of decrease of the thickness 20 of the substrate 12 was calculated based on the time period that the etching solution contacted the substrate 12 and a micrometer measurement of the thickness 20 of the substrate 12 taken before and after the etching solution contacted the substrate 12 during the etching step 36. The results are shown below in Table 1 and shown in FIG. 6.

TABLE 1

| Sample | NaOH concentration (wt.) | Substrate | Solution Temperature (° C.) | Thickness Reduction Rate (μm/hr) |
|---|---|---|---|---|
| Ex. 2A | 10 | Glass A | 101 | 4.22 |
|  | 20 |  | 107.1 | 7.70 |
|  | 30 |  | 116.7 | 16.57 |
|  | 40 |  | 128.8 | 35.99 |
|  | 50 |  | 132.5 | 46.36 |
| Ex. 2B | 10 | Glass B | 101 | 9.56 |
|  | 20 |  | 107.1 | 17.94 |
|  | 30 |  | 116.7 | 38.60 |
|  | 40 |  | 128.8 | 85.86 |
|  | 50 |  | 132.5 | not obtained |
| Ex. 2C | 10 | Glass C | 101 | not obtained |
|  | 20 |  | 107.1 | 5.63 |
|  | 30 |  | 116.7 | 10.04 |
|  | 40 |  | 128.8 | 14.97 |
|  | 50 |  | 132.5 | 19.38 |
| Ex. 2D | 10 | Glass-Ceramic C | 101 | 0.50 |
|  | 20 |  | 107.1 | 0.85 |
|  | 30 |  | 116.7 | 1.94 |
|  | 40 |  | 128.8 | 4.22 |
|  | 50 |  | 132.5 | 5.51 |

Figure 6:
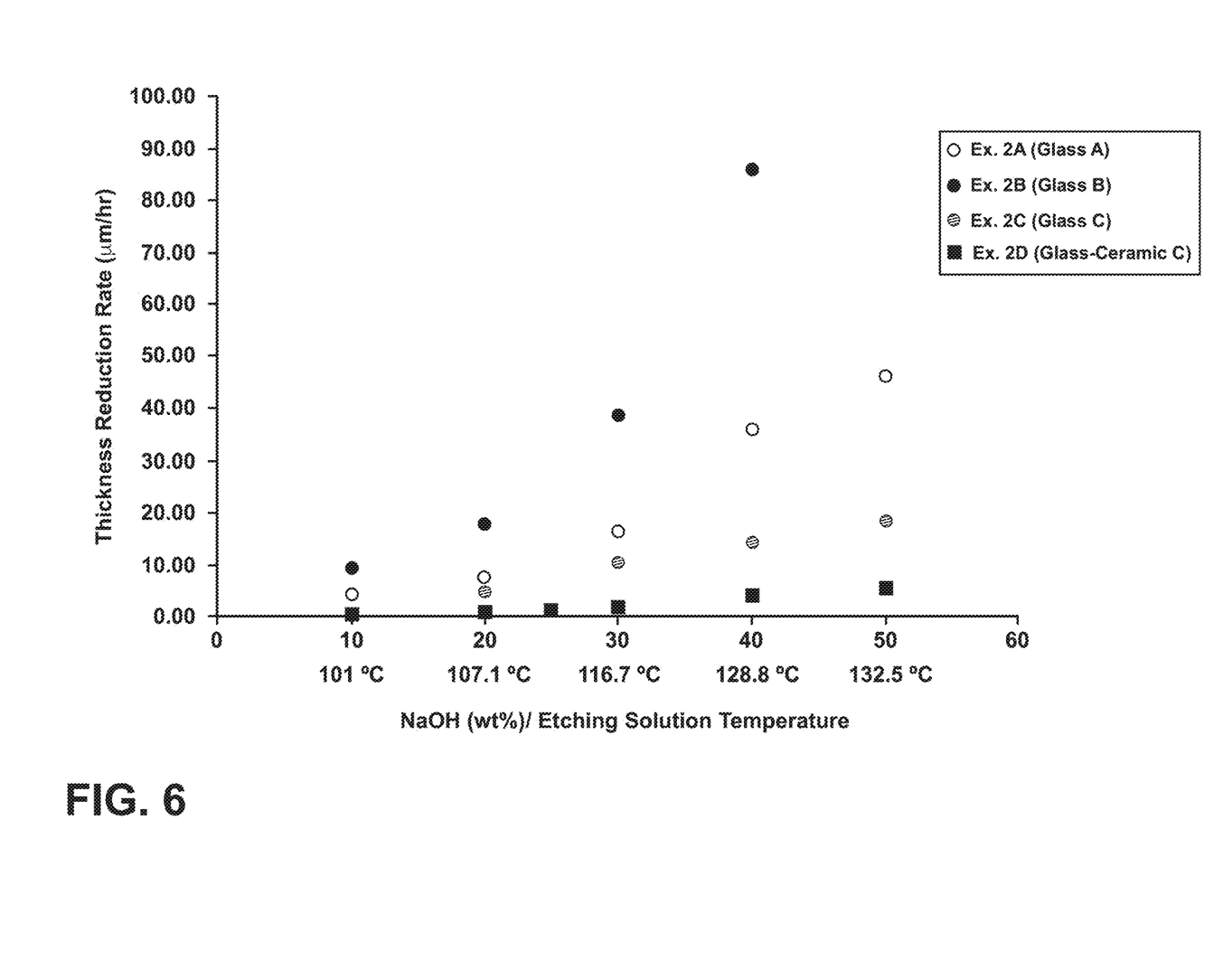
FIG. 6 is a graph plotting the rate of thickness reduction of the substrate during the etching step of the method of FIG. 1 as a function of the concentration of sodium hydroxide in the etching solution and the temperature of the etching solution for substrates having various compositions (Glass A, Glass B, etc.)

Referring now to FIG. 6, a plot is provided of the data shown in Table 1. In particular, FIG. 6 depicts the thickness 20 reduction rate vs. concentration of NaOH in the etching solution for the samples prepared and contacted with the etching solution as described above. As is evident from FIG. 6 and Table 1, the higher the concentration of the alkali hydroxide (NaOH) in the etching solution contacting the textured primary surfaces 14, 16 of the substrate 12, and the higher the temperature of the etching solution, the faster the thickness 20 of the substrate 12 was reduced. Compared to the thickness 20 reduction rate for 10 wt. % NaOH at 101° C., the thickness 20 reduction rate for 50 wt. % NaOH at 132° C. was more than 10 times higher for each of the substrates Glass A, Glass B, and Glass-Ceramic C (i.e., Exs. 2A, 2B, and 2D). Further, it is evident that the substrate Glass C (the 'green glass' version of Glass-Ceramic C, i.e., Glass C, Ex. 2C) exhibited a significantly higher thickness 20 reduction rate than the Glass-Ceramic C (Ex. 2D) at each of the concentration and temperature conditions. For example, the thickness 20 reduction rates of the Glass-Ceramic C (Ex. 2D) at 20 wt. % NaOH/107.1° C. and 50 wt. % NaOH/132.5° C. were 0.85 and 5.51 μm/hr, respectively. In contrast, the thickness 20 reduction rates of the 'green glass' version (Glass C, Ex. 2C) at 20 wt. % NaOH/107.1° C. and 50 wt. % NaOH/132.5° C. were significantly higher—i.e., 5.63 and 19.38 μm/hr, respectively, which are both indicative of the thickness 20 reduction rate increases of at least a factor of 4.

Example 3

According to this example, the samples of the previous example subjected to a 20 wt. % NaOH solution at 107.1° C. (Exs. 2A-2D) were compared to samples etched with the etching solution having the same concentration NaOH and temperature but further including various additives added to the etching solution (Exs. 3A, 3B and Comp. Ex. 3A). In particular, the etching solution contacting the substrate 12 in Ex. 3A further included 5 wt. % $Na_3PO_4$, the etching solution contacting the substrate 12 in Ex. 3B further included 2 wt. % EDTA, and the etching solution contacting the substrate 12 in Comp. Ex. 3C further included 0.1 wt. % $H_3SiF_6$.

Figure 7:
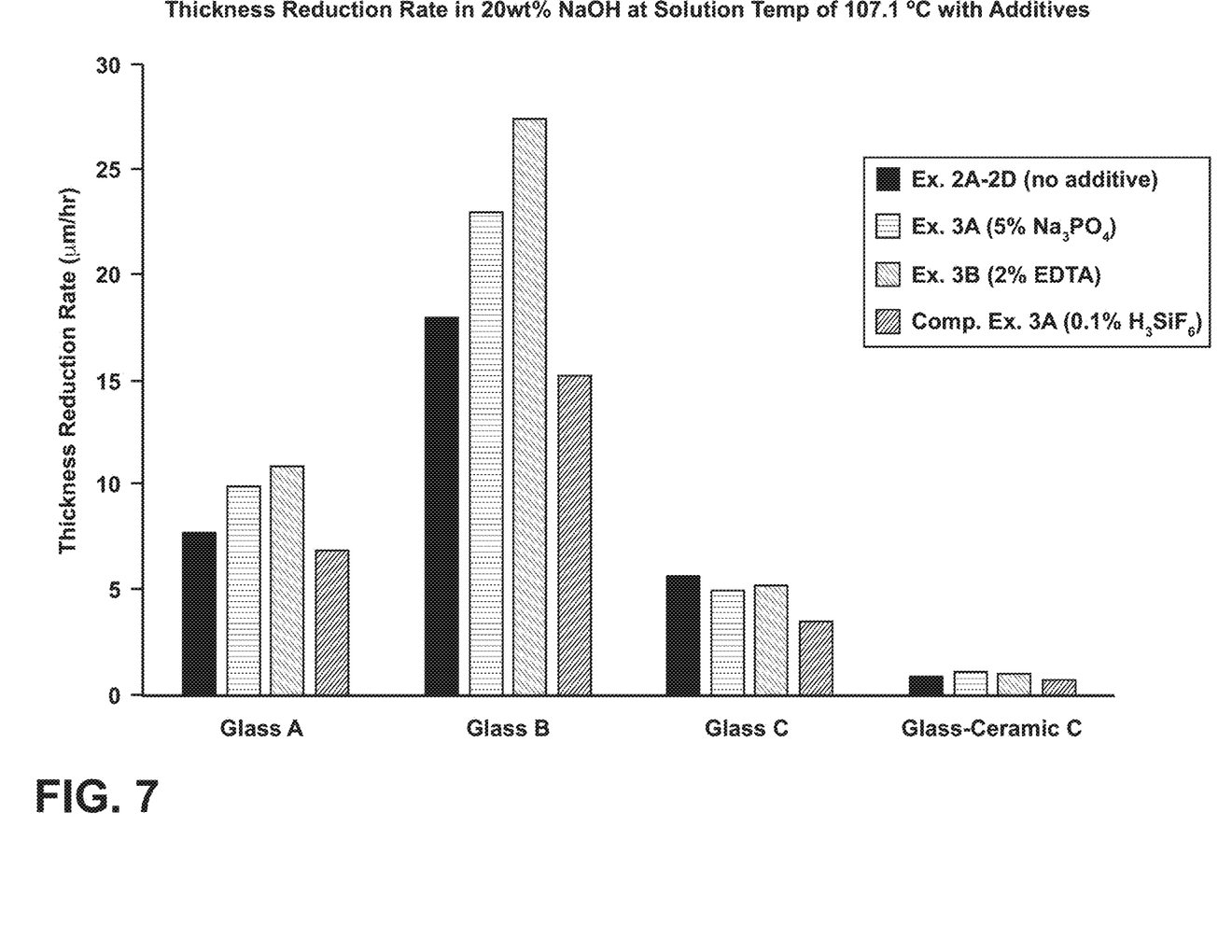
FIG. 7 is a graph plotting the rate of thickness reduction of the substrate during the etching step of the method of FIG. 1 as a function of the amount and type of "additive" added to the etching solution for substrates having various compositions (Glass A, Glass B, etc.), illustrating that the addition of $Na_3PO_4$ or EDTA to the etching solution increased the rate of thickness reduction compared to the rate of thickness reduction achieved by the etching solution without either of the additives.
Figure 8:
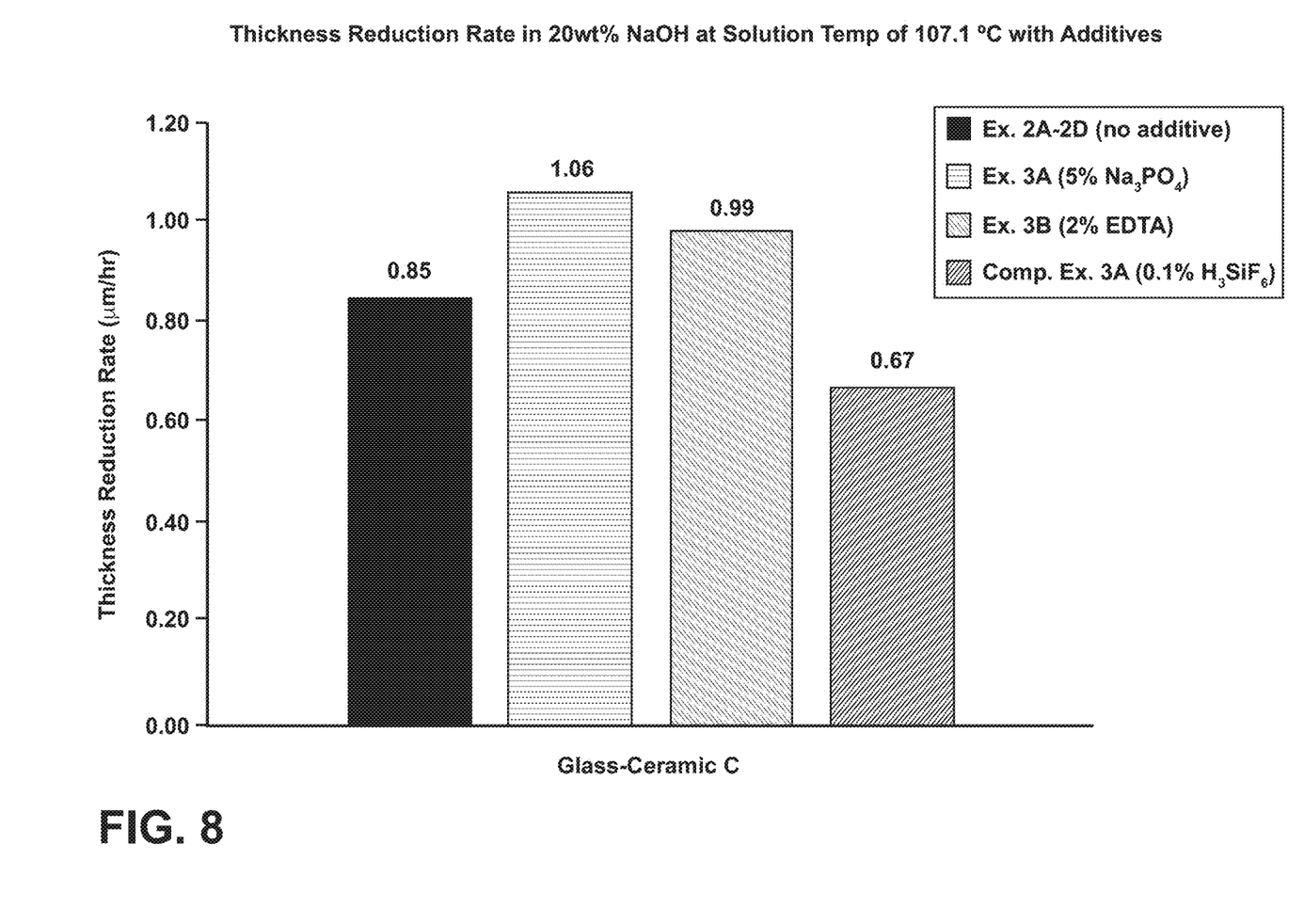
FIG. 8 is a graph plotting the rate of thickness reduction of the substrate during the etching step of the method of FIG. 1 as a function of the amount and type of "additive" added to the etching solution for a particular substrate, which is a glass-ceramic substrate, illustrating that the addition of $Na_3PO_4$ or EDTA to the etching solution increased the rate of thickness reduction compared to the rate of thickness reduction achieved by the etching solution without either of the additives (note that FIG. 8 provides the same data as FIG. 7 for "Glass-Ceramic C" but with a different scale).

Referring now to FIGS. 7 and 8, a bar graph plot is provided for the samples of this example. In particular, FIG. 7 shows the thickness 20 reduction rate for the substrates 12 of FIG. 5 (i.e., the prior examples, Exs. 2A-2D), when contacted with an etching solution including 20 percent by weight NaOH and various additives (i.e., $Na_3PO_4$, EDTA, and $H_3SiF_6$) (Ex. 3A, 3B, and Comp. Ex. 3A). As is evident from FIGS. 7 and 8, the samples contacted with the etching solution including $Na_3PO_4$ and EDTA (Ex. 3A and 3B) experienced significantly improved thickness 20 reduction rates compared to when the samples were contacted with the etching solution not including $Na_3PO_4$ and EDTA (Exs. 2A-2D). In contrast, the samples contacted with the NaOH etching solution including $H_3SiF_6$ (Comp. Ex. 3A) did not experience a similarly improved thickness 20 reduction rate compared to when the samples were contacted with the etching solution alone. For example, and best illustrated in FIG. 8, the samples of the Glass-Ceramic C contacted with the etching solution including $Na_3PO_4$ (Ex. 3A) and EDTA (Ex. 3B) experienced a thickness 20 reduction rate of 1.06 µm/hr and 0.99 µm/hr, respectively. In contrast, the sample of the Glass-Ceramic substrate contacted with the etching solution alone (Ex. 2D) experienced a thickness 20 reduction rate of 0.85 µm/hr.

According to a first aspect, a method of modifying a substrate comprises: an etching step comprising contacting one or more primary surfaces of a glass, glass-ceramic, or ceramic substrate with an etching solution for a time period of 20 minutes to 8 hours to generate one or more etched primary surfaces, the etching solution comprising over 10 percent by weight of one or more alkali hydroxides, the etching solution having a temperature within the range of 100° C. to 150° C., the substrate having a thickness between the primary surfaces that decreases during the time period by 5 µm to 100 µm at rate of 2 µm per hour or greater.

According to a second aspect, the first aspect is provided, the method further comprising a texturing step, occurring before the etching step, the texturing step comprising increasing a surface roughness ($R_a$) of one or more of the primary surfaces of the substrate to generate one or more textured primary surfaces, and the etching step comprises contacting the one or more textured primary surfaces with the etching solution.

According to a third aspect, either of the first or second aspects is provided, wherein, increasing the surface roughness ($R_a$) comprises blasting the one or more of the primary surfaces with particles projected by pressurized gas.

According to a fourth aspect, any one of the first through third aspects is provided, wherein the substrate is a glass substrate, and the method further comprises a ceramming step, occurring after the etching step, the ceramming step comprising ceramming the glass substrate into a glass-ceramic substrate.

According to a fifth aspect, any one of the first through third aspects is provided, wherein the substrate is a glass-ceramic substrate.

According to a sixth aspect, any one of the first through fifth aspects is provided, wherein the etching solution does not comprise hydrogen fluoride.

According to a seventh aspect, any one of the first through sixth aspects is provided, wherein the etching solution further comprises one or more of an alkali metal phosphate salt, an alkali metal carbonate salt, and a chelating agent.

According to an eighth aspect, any one of the first through seventh aspects is provided, wherein the etching solution further comprises one or more of $Na_3PO_4$ and EDTA.

According to a ninth aspect, any one of the first through eighth aspects is provided, wherein the one or more alkali hydroxides of the etching solution is sodium hydroxide (NaOH), potassium hydroxide (KOH), or a combination of both sodium hydroxide and potassium hydroxide.

According to a tenth aspect, a method of making a glass-ceramic substrate comprises: a texturing step comprising increasing a surface roughness ($R_a$) of one or more of the primary surfaces of a glass substrate to generate one or more textured primary surfaces; an etching step comprising contacting the one or more textured primary surfaces of the glass substrate with an etching solution for a time period of 20 minutes to 8 hours to generate one or more etched primary surfaces, the etching solution comprising over 10 percent by weight of one or more alkali hydroxides, the etching solution having a temperature within the range of 100° C. to 150° C., the substrate having a thickness between the primary surfaces that decreases during the time period by 5 µm to 100 µm at rate of 0.5 µm per hour or greater; and a ceramming step comprising ceramming the glass substrate into a glass-ceramic substrate.

According to an eleventh aspect, the tenth aspect is provided, wherein increasing the surface roughness ($R_a$) comprises blasting the one or more of the primary surfaces with particles projected by pressurized gas.

According to a twelfth aspect, either of the tenth or eleventh aspects is provided, wherein the etching solution does not comprise hydrogen fluoride.

According to a thirteenth aspect, any one of the tenth through twelfth aspects is provided, wherein the etching solution further comprises one or more of an alkali metal phosphate salt, an alkali metal carbonate salt, and a chelating agent.

According to a fourteenth aspect, any one of the tenth through thirteenth aspects is provided, wherein the etching solution further comprises one or more of $Na_3PO_4$ and EDTA.

According to a fifteenth aspect, any one of the tenth through fourteenth aspects is provided, wherein the one or more alkali hydroxides of the etching solution is sodium hydroxide (NaOH), potassium hydroxide (KOH), or a combination of both sodium hydroxide and potassium hydroxide.

According to a sixteenth aspect, a method of modifying a substrate comprises: a texturing step comprising increasing a surface roughness ($R_a$) of one or more primary surfaces of a glass, glass-ceramic, or ceramic substrate to generate one or more textured primary surfaces; and an etching step comprising contacting the one or more textured primary surfaces with an etching solution for a time period of 20 minutes to 8 hours to generate one or more etched primary surfaces, the etching solution comprising over 10 percent by weight of one or more alkali hydroxides, the etching solution having a temperature within the range of 100° C. to 150° C., the substrate having a thickness between the primary surfaces that decreases during the time period by 5 µm to 100 µm at rate of 0.5 µm per hour or greater.

According to an seventeenth aspect, the sixteenth aspect is provided, wherein increasing the surface roughness ($R_a$) comprises blasting the one or more of the primary surfaces with particles projected by pressurized gas.

According to an eighteenth aspect, either of the sixteenth or seventeenth aspects is provided, wherein the etching solution of the etching step further comprises one or more of an alkali metal phosphate salt, an alkali metal carbonate salt, and a chelating agent.

According to a nineteenth aspect, any one of the sixteenth through eighteenth aspects is provided, wherein increasing the surface roughness ($R_a$) comprises blasting the one or more of the primary surfaces with particles projected by pressurized gas.

According to a twentieth aspect, any one of the sixteenth through nineteenth aspects is provided, wherein the one or more alkali hydroxides of the etching solution is sodium hydroxide (NaOH), potassium hydroxide (KOH), or a combination of both sodium hydroxide and potassium hydroxide.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A method of modifying a substrate comprising:
   an etching step comprising contacting one or more primary surfaces of a glass, glass-ceramic, or ceramic substrate with an etching solution for a time period of 20 minutes to 8 hours to generate one or more etched primary surfaces, the etching solution comprising over 10 percent by weight of one or more alkali hydroxides, the etching solution having a temperature within the range of 100° C. to 150° C., the substrate having a thickness between the primary surfaces that decreases during the time period by 5 μm to 100 μm at a rate of 2 μm per hour or greater, wherein, the etching solution does not comprise hydrogen fluoride.

2. The method of claim 1 further comprising:
   a texturing step, occurring before the etching step, the texturing step comprising increasing a surface roughness ($R_a$) of one or more of the primary surfaces of the substrate to generate one or more textured primary surfaces, and the etching step comprises contacting the one or more textured primary surfaces with the etching solution.

3. The method of claim 2,
   wherein, increasing the surface roughness ($R_a$) comprises blasting the one or more of the primary surfaces with particles projected by pressurized gas.

4. The method of claim 1,
   wherein, the substrate is a glass substrate; and
   the method further comprises a ceramming step, occurring after the etching step, the ceramming step comprising ceramming the glass substrate into a glass-ceramic substrate.

5. The method of claim 1,
   wherein, the substrate is a glass-ceramic substrate.

6. The method of claim 1, wherein
   the etching solution is an aqueous solution;
   the etching solution comprises 20 wt % to 50 wt % of the one or more alkali hydroxides; and
   the temperature of the etching solution is within the range of 105° C. to 150° C.

7. The method of claim 1,
   wherein, the etching solution further comprises one or more of an alkali metal phosphate salt, an alkali metal carbonate salt, and a chelating agent.

8. The method of claim 1,
   wherein, the etching solution further comprises one or more of $Na_3PO_4$ and EDTA.

9. The method of claim 1,
   wherein, the one or more alkali hydroxides of the etching solution is sodium hydroxide (NaOH), potassium hydroxide (KOH), or a combination of both sodium hydroxide and potassium hydroxide.

10. A method of making a glass-ceramic substrate comprising:
    a texturing step comprising increasing a surface roughness ($R_a$) of one or more of the primary surfaces of a glass substrate to generate one or more textured primary surfaces;
    an etching step comprising contacting the one or more textured primary surfaces of the glass substrate with an etching solution for a time period of 20 minutes to 8 hours to generate one or more etched primary surfaces, the etching solution comprising over 10 percent by weight of one or more alkali hydroxides, the etching solution having a temperature within the range of 100° C. to 150° C., the substrate having a thickness between the primary surfaces that decreases during the time period by 5 μm to 100 μm at a rate of 0.5 μm per hour or greater, wherein, the etching solution does not comprise hydrogen fluoride; and
    a ceramming step comprising ceramming the glass substrate into a glass-ceramic substrate.

11. The method of claim 10,
    wherein, increasing the surface roughness ($R_a$) comprises blasting the one or more of the primary surfaces with particles projected by pressurized gas.

12. The method of claim 10,
    wherein, the etching solution further comprises one or more of an alkali metal phosphate salt, an alkali metal carbonate salt, and a chelating agent.

13. The method of claim 10,
    wherein, the etching solution further comprises one or more of $Na_3PO_4$ and EDTA.

14. The method of claim 10,
    wherein, the one or more alkali hydroxides of the etching solution is sodium hydroxide (NaOH), potassium hydroxide (KOH), or a combination of both sodium hydroxide and potassium hydroxide.

15. A method of modifying a substrate comprising:
    a texturing step comprising increasing a surface roughness ($R_a$) of one or more primary surfaces of a glass, glass-ceramic, or ceramic substrate to generate one or more textured primary surfaces; and
    an etching step comprising contacting the one or more textured primary surfaces with an etching solution for a time period of 20 minutes to 8 hours to generate one or more etched primary surfaces, the etching solution comprising over 10 percent by weight of one or more alkali hydroxides, the etching solution having a temperature within the range of 100° C. to 150° C., the substrate having a thickness between the primary surfaces that decreases during the time period by 5 μm to 100 μm at a rate of 0.5 μm per hour or greater, wherein, the etching solution does not comprise hydrogen fluoride.

16. The method of claim 15,
    wherein, the substrate is a glass substrate; and
    the method further comprises a ceramming step, occurring after the etching step, the ceramming step comprising ceramming the glass substrate into a glass-ceramic substrate.

17. The method of claim 15,
    wherein, the etching solution of the etching step further comprises one or more of an alkali metal phosphate salt, an alkali metal carbonate salt, and a chelating agent.

18. The method of claim 15,
    wherein, increasing the surface roughness ($R_a$) comprises blasting the one or more of the primary surfaces with particles projected by pressurized gas.

19. The method of claim 15,
    wherein, the one or more alkali hydroxides of the etching solution is sodium hydroxide (NaOH), potassium hydroxide (KOH), or a combination of both sodium hydroxide and potassium hydroxide.

* * * * *